Patented June 8, 1926.

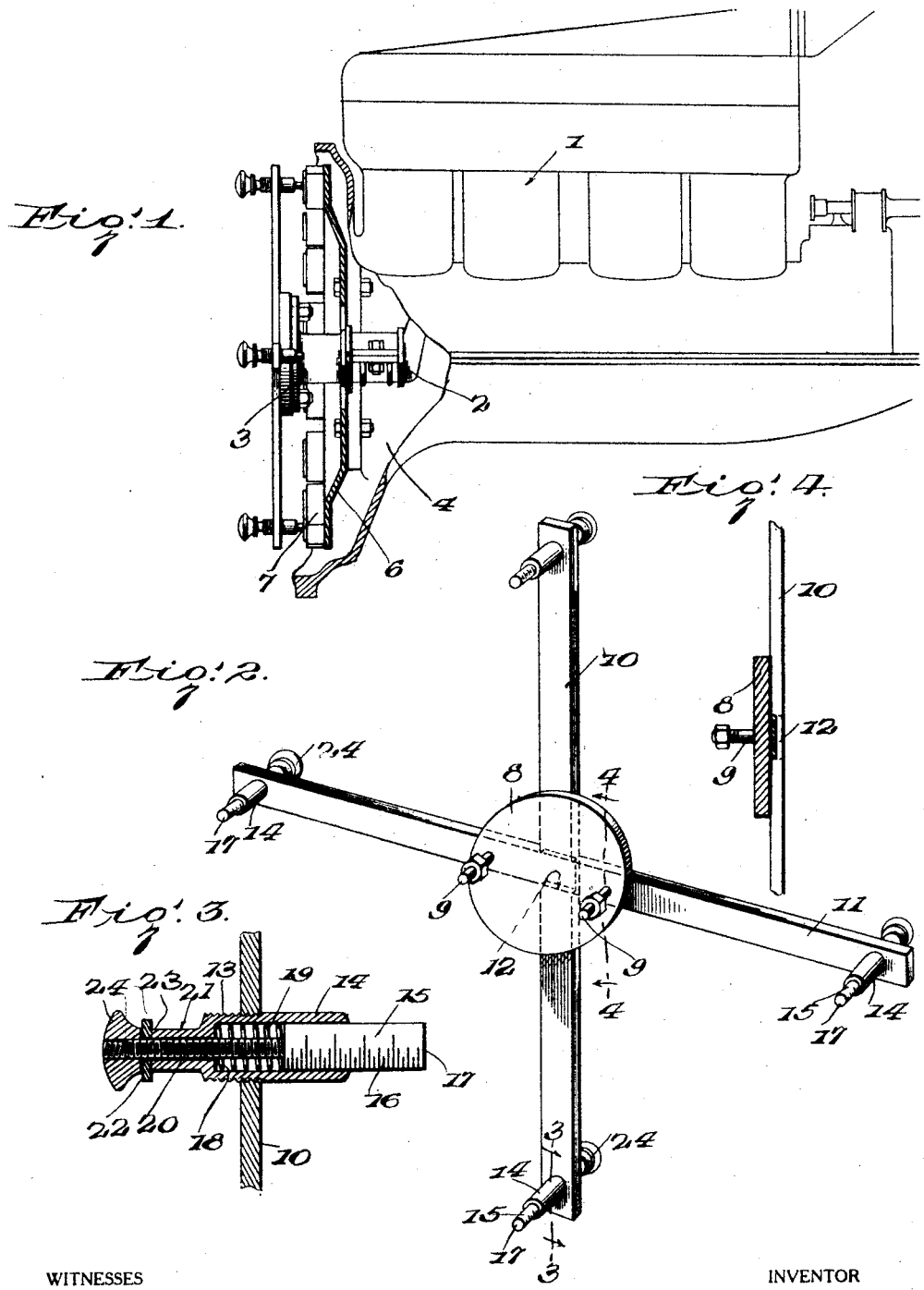

1,588,101

UNITED STATES PATENT OFFICE.

ROY ARTY FARNAM, OF LA GRANDE, OREGON.

COLLOCATING GAUGE.

Application filed May 22, 1925. Serial No. 32,110.

This invention relates to gauges for predetermining the position of the field coils on the crank shaft of the well known Ford construction.

In the well known Ford engine construction the magneto consists of a plurality of magnets disposed circumferentially on the fly wheel of the engine and spaced a predetermined distance from the field coils carried by a disc or frame and maintained stationary with respect to the revolving magnets on the fly wheel. When it is desired to replace any portion of the magneto or to remove the fly wheel, a great deal of difficulty is experienced in attempting to properly position the field coils a predetermined distance from the magnets on the fly wheel in order to obtain the proper strength of current for the operation of the ignition system of the engine.

It is an object of the present invention to provide a gauge which is adapted to be bolted by means of the usual bolt holes in the fly wheel attaching flange on the crank shaft of the Ford engine having spaced points adapted to engage the field coils for predeterminedly positioning said coils, the spacing points on the gauge being adapted to disclose the position that the field coils should have in order to be cooperatively located with respect to the magnets on the fly wheel.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view of a Ford engine partly in section showing my improved gauge operatively connected with the fly wheel flange of the crank shaft.

Figure 2 is a view in perspective of a gauge disconnected from the crank shaft.

Figure 3 is a transverse vertical section taken along the line 3—3 of Figure 2.

Figure 4 is a transverse vertical section taken along the line 4—4 of Figure 2.

Referring more particularly to the drawings, 1 designates an internal combustion engine of the Ford type having a crank shaft 2 and an attaching flange 3 on the crank shaft to which the usual fly wheel is connected by means of bolts. Secured to the engine housing 4 by means of brackets is a disc 6 provided on the face adjacent the fly wheel with a plurality of field coils 7. The field coils are adapted to be spaced a predetermined distance from the magnets secured to the fly wheel and form part of the fly wheel construction so that when the shaft 2 is revolved the fly wheel and the magnets are likewise revolved in close association with the field coils 7.

In view of the fact that the outer ends of the magnets are given a predetermined position in a vertical plane when the fly wheel is secured to the attaching flange 3 it is therefore necessary to properly adjust the field coils 7 in a proper spaced relation with the magnets on the fly wheel in order to obtain the most efficient results for producing a current to maintain the ignition system.

I have provided a plurality of plungers adapted to be so positioned on the frame that they will give the correct position of the magnets on the fly wheel when the fly wheel is secured to the usual attaching flange 3 on the shaft 2. By this means the discs 6 which support the field coils may be so positioned on the crank shaft that the coils will be in proper spaced relation.

The gauge for the purpose consists of a disc 8 having laterally projecting threaded studs 9. These studs are adapted to be received by the usual perforations in the flange 3 which are adapted to receive the bolts for securing the usual fly wheel on said flange. Nuts are provided for rigidly locking the disc in position. On the back of the disc and on the face opposite to that which is provided with the studs 9 is rigidly mounted a pair of diametrically disposed arms 10 and 11, the arms being located at right angles to each other. The intermediate portions of said arms, as shown at 12, are cut away sufficiently so that when the arms are secured to the back of the disc 8 they will be in the same vertical plane.

The end of each arm is provided with a threaded perforation in which is screwed the threaded portion 13 of a cylinder 14. Slidably mounted in the cylinder is a plunger 15 having graduations 16 for a purpose which will be presently explained. The outer free end 17 of the plunger projects beyond the open end of the cylinder 14 and is adapted to engage the outer end of the field coils 7. The bottom of the cylinder 14 provides a shoulder 18 upon which rests one end of a coil spring 19 with the other end of said spring abutting the inner end of the plunger 15. The threaded stem 20 on the inner end of the plunger passes through a hollow reduced portion 21 of the cylinder 14 and is adapted to be engaged by a nut 22. This nut is locked against rotation by means of V-shaped projections 23 extending in complementary formed notches in the end of the reduced portion 21 of the cylinders. A lock nut and operating knob 24 is threaded upon the outer end of the stem 20.

The gauge is secured by means of the disc 8 and the threaded studs 9 to the flange 3 and the plungers 15 are adjusted by means of the knob 24 against the tension of the spring 19 until the proper gauge or until the desired length of the plunger is projected beyond the outer open end of the cylinder 14 and the outer ends 17 of said plunger are thus positioned to contact with the free ends of the field coils 7 mounted against rotation in the engine casing. By projecting the plunger 15 a sufficient distance to not only compensate for the outer ends of the magnets on the fly wheel but for the space between the ends of the magnets and the field coils 7 it is possible by moving the disc 6 to a position that the ends of the field coils will engage the ends 17 of the plungers that the field coils will be properly spaced from the magnets to produce the most effective results during the operation of the engine and the gauging may be done at any time either during the assembling of the engine or for reconstruction or repairs.

What I claim is:

1. A gauge for securing the proper clearance between field coils and magnet assembly on a shaft comprising a disc adapted to be bolted to the usual fly wheel securing flange of the crank shaft of an engine, arms connected to the disc and projecting radially from the same, a cylinder mounted in the end of each arm, a graduated plunger slidably mounted in each cylinder, and means for predeterminedly positioning the graduated plunger in projected relation from a cylinder.

2. A gauge for securing the proper clearance between the field coils and magnet assembly on a shaft comprising a disc adapted to be bolted to the usual fly wheel securing flange of the crank shaft of an engine, arms connected to the disc and projecting radially from the same, said arms being disposed at right angles to each other, a cylinder mounted in the end of each arm and disposed transversely of the plane of the arms, a graduated plunger slidably mounted in each cylinder, a stem connected with the plunger, a spring located between the inner end of the plunger and one end of the cylinder but tending to move the plunger outwardly of said cylinder, a nut on the end of the sleeve for predetermining the projected position of the plunger from the cylinder, the free ends of the plunger being adapted to contact with the outer ends of the field coils.

ROY ARTY FARNAM.